(12) United States Patent
Takano

(10) Patent No.: US 9,033,260 B2
(45) Date of Patent: May 19, 2015

(54) WATER SAVING AERATOR

(76) Inventor: Masaaki Takano, Higashiosaka (JP)

(*) Notice: Subject to any disclaimer, the term of this patent is extended or adjusted under 35 U.S.C. 154(b) by 0 days.

(21) Appl. No.: 13/127,154

(22) PCT Filed: Oct. 31, 2008

(86) PCT No.: PCT/JP2008/070364
§ 371 (c)(1),
(2), (4) Date: May 2, 2011

(87) PCT Pub. No.: WO2010/050074
PCT Pub. Date: May 6, 2010

(65) Prior Publication Data
US 2011/0215175 A1     Sep. 8, 2011

(51) Int. Cl.
*E03C 1/084*     (2006.01)
*B05B 7/04*      (2006.01)
*B05B 15/06*     (2006.01)

(52) U.S. Cl.
CPC ............ *E03C 1/084* (2013.01); *B05B 7/0425* (2013.01); *B05B 15/065* (2013.01)

(58) Field of Classification Search
CPC .......... E03C 1/08; E03C 1/084; E03C 1/086; B05B 7/0425; B05B 7/0458; B05B 7/0475; B05B 7/0483; B05B 15/065
USPC .......... 239/423, 424, 425.5, 428.5, 429, 430, 239/431, 432, 433, 434, 590, 590.3, 590.5, 239/596, 600; 137/801, 888
See application file for complete search history.

(56) References Cited

U.S. PATENT DOCUMENTS 2,510,395 A * 6/1950 Goodrie ............... 239/428.5
3,130,918 A * 4/1964 Aghnides .............. 239/428.5
(Continued)

FOREIGN PATENT DOCUMENTS

EP     0856691 A1    4/2003
JP     U 49-93650    8/1974
(Continued)

OTHER PUBLICATIONS

Extended European Search Report, Apr. 8, 2014; European Application No. 08877784.2 (6 pages).

*Primary Examiner* — Darren W Gorman
(74) *Attorney, Agent, or Firm* — Hamre, Schumann, Mueller & Larson, P.C.

(57) ABSTRACT

The present invention provides a water saving aerator that can reduce the amount of water flow and generate bubble foam water from water provided by the water delivery apparatus such as a water tap. The water saving aerator comprises a water saving disc 10 for controlling the amount of water from the water tap 200, having the through-hole 11 whose diameter is smaller than that of the water tap 200, so the water flow is injected by covering the opening of the water tap 200. A first cylinder 30 covering a diffuser object 20 is provided and a second cylinder 40 covering the first cylinder 30 is provided. The water injected from the through-hole 11 of the water saving disc 10 is diffused by the diffuser object 20, and the diffused water is received by the inner wall of the first cylinder 30. An air intake hole 33 is formed on the upper portion of the first cylinder 30, and when the air pressure of the first cylinder 30 is decreased by the water flow running into the water pass 71 between the diffuser object 20 and the first cylinder 30, the outer air is ventilated through the ventilation pass 72 formed between the first cylinder 30 and the second cylinder 40 via the air intake hole 33, the bubble form water is generated by mixing the water flow and air.

9 Claims, 13 Drawing Sheets

(56) References Cited

U.S. PATENT DOCUMENTS

| | | | |
|---|---|---|---|
| 3,143,299 A * | 8/1964 | Benjamin | 239/427 |
| 3,286,935 A | 11/1966 | Corlett et al. | |
| 3,334,818 A * | 8/1967 | Moen | 239/428.5 |
| 3,664,589 A | 5/1972 | Jatho et al. | |
| 4,000,857 A * | 1/1977 | Moen | 239/428.5 |
| 4,637,552 A * | 1/1987 | Finkbeiner et al. | 239/428.5 |
| 6,027,044 A | 2/2000 | Hirata | |

FOREIGN PATENT DOCUMENTS

| | | |
|---|---|---|
| JP | 50-32041 Y2 | 9/1975 |
| JP | U 59-56272 | 4/1984 |
| JP | 09-095985 | 4/1997 |
| JP | 2000-104300 | 4/2000 |
| JP | U 3114347 | 8/2005 |
| NL | 7206141 | 7/1973 |
| WO | WO 98/08013 | 2/1998 |

* cited by examiner

WATER SAVING AERATOR

TECHNICAL FIELD

This invention relates to a water saving aerator attached to the water delivery devices such as a water tap (including a general water tap and a special purpose water tap for laboratory use) and a shower head for saving the amount of the water flow and aerating the water for generating bubble foam water.

BACKGROUND ART

The water saving is required in many settings including ordinary homes and in commercial facilities. One of the water saving methods is attaching a water saving disc to the water delivery devices such as a water tap. The water saving disc in the prior art is attached to the water delivery devices by installing the pillar-shaped disc inside of the water tap. The amount of the water flow is decreased by narrowing the water flow diameter with the water saving disc even if the opening diameter of the water tap is large.

For example, the basic shape of the conventional water saving disc is a pillar-shape corresponding to the cylindrical water pipe and the through-hole penetrates from the upper surface to the lower surface of the pillar-shape water saving disc. When installing such a conventional water saving disc to the water tap, the amount of the running water is decreased because the passage of the water flow is limited to the through-hole whose diameter is less than that of the water tap, so the water saving is achieved. The number of the through-hole is not limited to one, and two or three through-holes can be arranged in the conventional water saving disc.

For example, the conventional water saving disc described in the JP H09-095985 comprises a pillar-shaped water saving disc and at least three through-holes formed through from the upper surface to the lower surface. These through-holes can have a certain skew relative to each other. For example, the distance between the through-holes on the upper surface is small, and the distance between the through-holes on the lower surface becomes large corresponding to its height. In general, the large flange is formed on the upper surface edge, so the conventional water saving disc can be installed in the water tap. Three through-holes are formed through the water saving disc, and these though holes are arranged in a concentric circle.

Generally speaking, there are certain needs to make so-called bubble foam water from the normal tap water by aeration. In the prior art, there are several conventional water saving discs that include the aeration mechanism. The conventional aeration mechanism utilizes the side hole formed in the side wall for aerating the outer air into the water flow running in front of the hole. In this conventional aeration mechanism, only a small amount of air can be aerated to the water flow and an insufficient quality level of the bubble foam water is obtained.

Prior art 1: JP H09-095985
Prior art 2: JP 2000-104300
Prior art 3: JP Utility model 3114347

DISCLOSURE OF THE INVENTION

The Problems to be Solved

The conventional water saving disc described in JP H09-095985 has the following problem. The conventional water saving disc utilizes the through-hole having the small diameter smaller than that of the water tap, so the passage diameter of the water flow becomes small. However, the water flow coming from such a small through-hole becomes very fast and strong water flow because of the high water pressure provided in the water tap, and sometimes, the water flow becomes too strong to use. In other words, the water flow from the through-hole with small diameter becomes intensely strong, and sometimes the water flow becomes so strong as to cause pain when putting a hand in the water flow. This problem has occurred when utilizing the small diameter through-hole smaller than that of the water tap.

If such a conventional water saving disc is attached to the water tap in the ordinary homes, the water flow becomes too strong to use for washing a hand. In the same manner, if such a conventional water saving disc is attached to the water tap in the laboratory, the water flow becomes too strong to use for washing experiment tools and materials.

Regarding generating the bubble foam water, the conventional water saving disc described in the JP Utility model 3114347 can aerate the small amount of air near the side hole to the water flow running through the water tap, and only a small amount of air can be aerated to the outer surface of the water flow, so the generated bubble foam water includes an insufficient amount of air.

Therefore, it is an object of the present invention to provide a water saving aerator that can save the water amount running through the water tap, control and adjust the speed of the water flow appropriately. It is also an object of the present invention to provide a water saving aerator that can aerate the air to the water flow appropriately to make high quality bubble foam water including a sufficient amount of air while saving the water appropriately.

Means for Solving the Problems

In order to achieve the above-mentioned object, the present invention of a water saving aerator comprises; a water saving disc covering the water tap outflow opening by at least a through-hole whose diameter is smaller than that of the water tap for obtaining water saving effect by limiting the total water outflow cross-sectional area to be less than the water tap inflow cross-sectional area; a diffuser object for diffusing the water coming from the water saving disc in the peripheral direction; a first cylinder for covering the diffuser from outside, receiving the water flow diffused by the diffuser at its inner wall, and leading the received water flow along the inner wall to a water pass.

It is preferable that the diffuser object is extended from and hung from the lower surface of the water saving disc, the diffuser object comprising a diffuser plate having certain skew from the center highest portion to the peripheral lowest portion, and the diffuser plate is located in the place facing the through-hole of the water saving disc. The diffuser object diffuses the water flow coming from the through-hole in the peripheral direction.

It is preferable that the first cylinder covers the diffuser object from the outside, the water pass is formed between the outer wall of the diffuser object and the inner wall of the first cylinder, and the water flow diffused by the diffuser object is received by the inner wall of the first cylinder and led to the lower water pass.

The above-mentioned configuration of the first invention of the water saving aerator can obtain the water saving effect by decreasing the total water outflow cross-sectional area to be less than the water tap inflow cross-sectional area, weaken the water flow appropriately by the diffuser object and lead the water down along the inner surface of the first cylinder. The speed of the water flow can be adjusted appropriately.

In addition, in order to achieve the above-mentioned object, the present invention of a water saving aerator further comprises an air cavity connected to the outer air that is provided in the first cylinder under the water saving disc. The water flow is injected to the air in the air cavity from the through-hole of the water saving disc and the water flow is led to the diffuser object through the air present in the air cavity, the bubble foam water is generated by aerating the air into the water flow injected by the water saving disc, diffusing in the peripheral direction by the diffuser object, and leading to the lower water pass by the first cylinder.

It is preferable that the present invention of a water saving aerator further comprises a second cylinder covering the first cylinder from the outside and providing a gap between the inner wall of the second cylinder and the outer wall of the first cylinder. In addition, the water saving aerator further comprises an air intake hole formed on the upper portion of the wall of the first cylinder higher than the diffuser object; wherein the ventilation pass for ventilating the outer air is formed by the gap between the inner wall of the second cylinder and the outer wall of the first cylinder to the air cavity via the air intake hole, and the air flow blown into the air cavity through the ventilation pass via the air intake hole is obtained by utilizing the low air pressure decreased by the water flow and the air flow from the air cavity to the water pass.

The above-mentioned configuration of the invention of the water saving aerator, it can obtain the bubble foam water by aerating a lot of air into the water in the water saving aerator.

Here, the water flow is injected from the through-hole of the water saving disc to the air present in the air cavity, the injected water flow, not to touch the inner wall of the first cylinder, hits the diffuser object directly for diffusing and aerating the air, as a result, the high quality bubble foam water can be generated by aerating a lot of air into the water flow.

There is enough distance between the water flow injected into the air cavity and the air intake hole formed on the upper portion of the inner wall of the first cylinder, so there is no possibility for the water to flow backward from the intake hole to the outer space. Because, the water flow injected from the through-hole of the water saving disc goes through the air in the air cavity and hits the diffuser object directly and the diffused water turns in the peripheral direction and then hits the inner wall of the first cylinder, so there is no possibility for the injected water to touch the inner wall of the first cylinder until after the injected water flow hits the diffuser object directly.

In the above-mentioned configuration, it is preferable that the airtightness of the first cylinder is enhanced by contacting the lower surface of the water saving disc and the upper surface of the first cylinder in order to limit the water inflow opening to the air cavity as the through-hole and limit the ventilation air inflow opening of the air cavity as the air intake hole.

In the above-mentioned configuration, it is preferable that the water saving aerator further comprises; a fastening object for pulling up and fixing the second cylinder to the water tap; a flange formed on the upper surface of the first cylinder for contacting the lower surface of the water saving disc; a flange stopper formed on the inner wall of the second cylinder facing to the flange of the first cylinder, wherein the three components such as the flange of the first cylinder, the flange stopper of the second cylinder and the lower surface of the water saving disc are fastened and pulled up by the fastening object, and the upper surface of the water saving disc is pressed to the water tap.

In order to obtain the airtightness of each components, it is preferable that the water saving aerator further comprises a gasket inserted between the upper surface of the water saving disc and the water tap, wherein the water saving disc is pulled up, the gasket is deformed between the upper surface of the water saving disc and the water tap, and the fine airtightness between the upper surface and the water tap can be enhanced by pressing the outer edge of the gasket to the inner wall of the first cylinder.

According to the above-mentioned configuration of the invention of the water saving aerator, the water saving disc is pressed to the outflow opening of the water tap tightly, there is no water leaking from the side portion of the water saving disc by the water pressure provided by the water tap.

Next, it is preferable that the fastening object comprises an inner flange facing to the upper edge of the second cylinder, and a gasket inserted between the inner flange of the fastening-up object and the upper edge of the second cylinder, wherein the gasket is deformed by being pressed by the upper edge of the second cylinder, and the friction force is generated between the outer edge of the first gasket and the inner wall of the fastening object. In addition, the friction force is generated between the inner edge of the gasket and the outer wall of the water tap.

According to the above-mentioned configuration, the friction force is generated between the outer edge of the gasket and the inner wall of the fastening-up object. In addition, the friction force is generated between the inner edge of the gasket and the outer wall of the water tap, and the water saving aerator is installed and fixed firmly to the water tap without dropping off.

Effect of the Present Invention

The water saving aerator of the present invention can achieve the sufficient water saving effect by narrowing down the water flow cross-sectional area from the water flow cross-sectional area, and it can decrease the speed of the water flow moderately with the diffuser object and turn the water flow along toward the inner wall of the first cylinder and moderate the speed of the water flow appropriately.

The water saving aerator of the present invention can make high quality bubble foam water by aerating the air to the water flow appropriately. The air intake is conducted via the intake hole utilizing the air pressure difference generated by the water flow. The water flow runs through the center portion of the water saving aerator keeping distance from the intake hole in order to prevent the water flow flushing back from the intake hole.

BRIEF DESCRIPTION OF THE DRAWINGS

FIG. 9 is an exploded view showing the structure of the diffuser object 20a.

Figure 10:
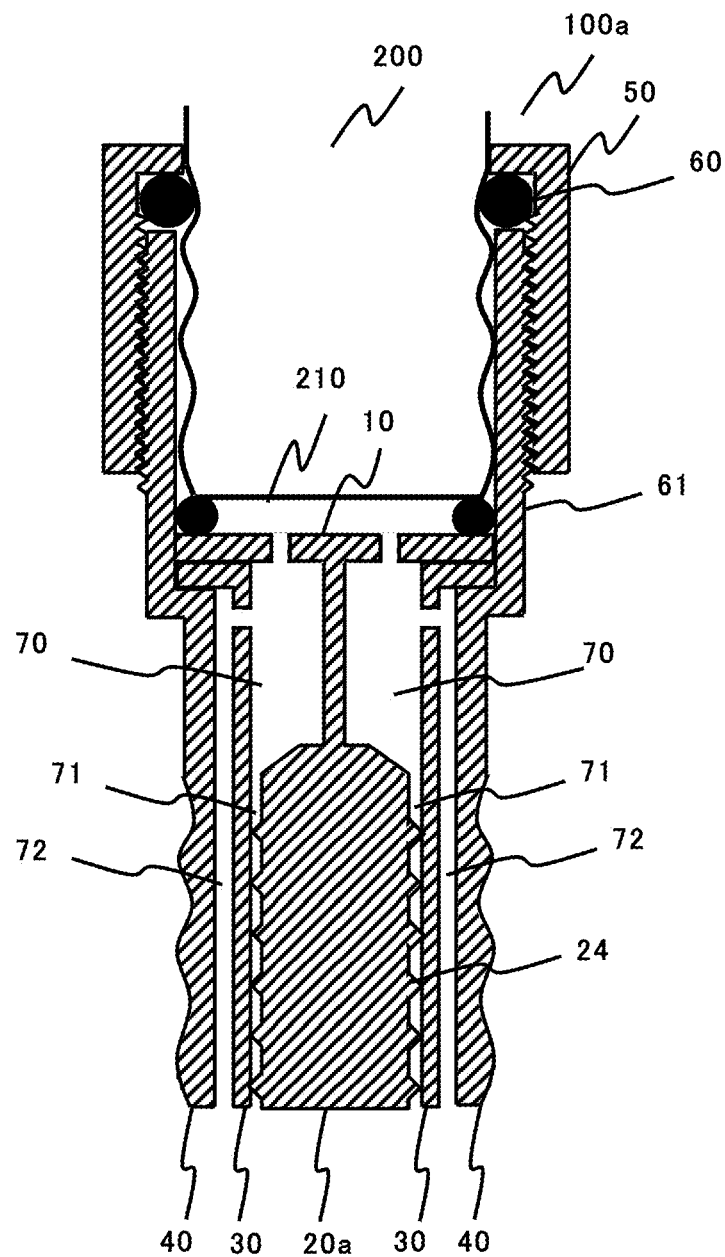
FIG. 10 is a schematic view of the serration 24 protruded on the lower object 23a in the water flow 71 for cutting and scattering the water flow into small cluster.

The reference number in the Figs.
- 10 denotes a water saving disc
- 11 denotes a through-hole
- 20 denotes a diffuser object
- 21 denotes a diffuser plate
- 22 denotes an extension object
- 23 denotes a lower object
- 24 denotes a serration
- 30 denotes a first cylinder
- 31 denotes a flange
- 32 denotes a cylinder object
- 33 denotes an air intake hole
- 34 denotes an inner space
- 35 denotes a serration
- 40 denotes a second cylinder
- 41 denotes a upper cylinder object
- 42 denotes a upper edge of the upper cylinder object
- 43 denotes an external thread
- 44 denotes a flange stopper
- 45 denotes an inner space of the upper cylinder object
- 46 denotes a lower cylinder object
- 47 denotes a corrugated outer surface
- 48 denotes an inner space of the lower cylinder object
- 48 denotes an inner space of the lower cylinder object
- 50 denotes a fastening object
- 51 denotes a cylinder object
- 52 denotes an inner flange of the upper edge of the cylinder object
- 53 denotes an internal thread
- 54 denotes an inner space of the cylinder object
- 60 denotes a first gasket
- 61 denotes a second gasket
- 100, 100a, 100b and 100c denotes a water saving aerator

DETAILED DESCRIPTION OF THE PREFERRED EMBODIMENT

Some embodiments of a water saving aerator according to the present invention are described below with reference to the relevant drawing. Needless to add, the claims of the present invention include but are not limited to the application, configuration, or quantity shown in the following embodiments.

(Embodiment 1)

Figure 1:
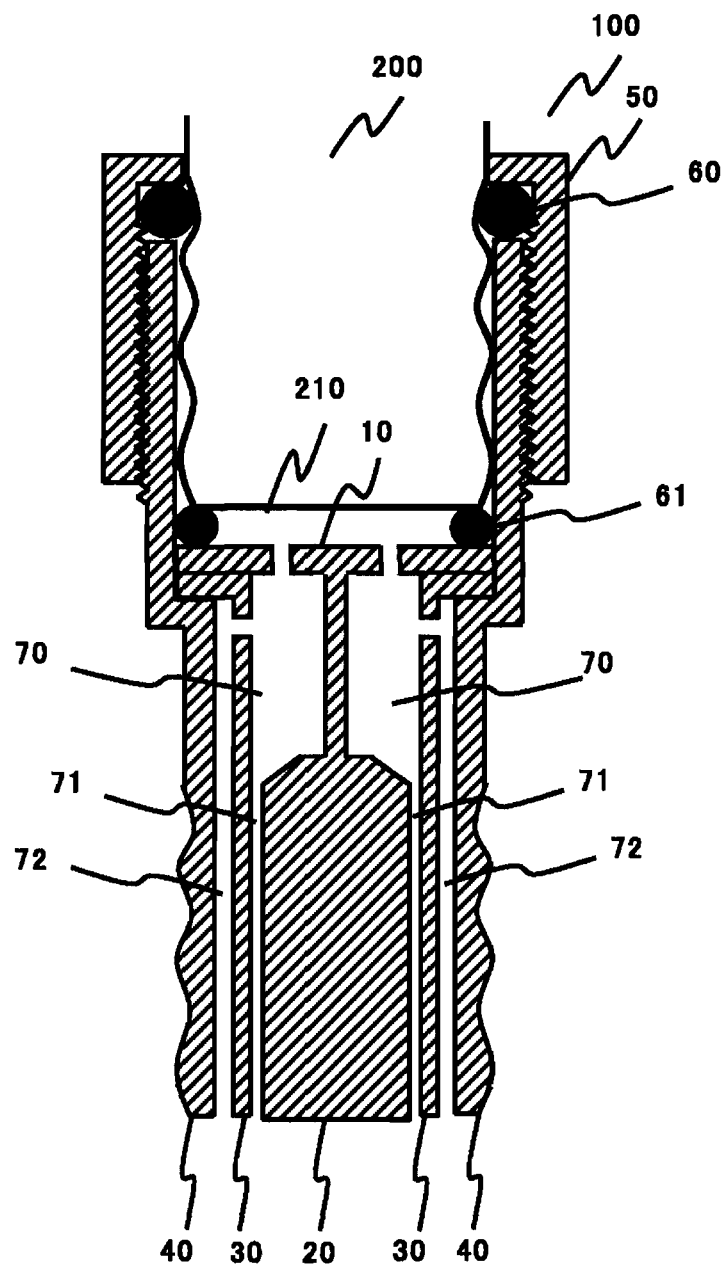
FIG. 1 is a schematic view of the water saving aerator 100 in embodiment 1.

A schematic view of the water saving aerator 100 is shown as an example of this embodiment 1. FIG. 1 is a schematic view of the water saving aerator 100 in embodiment 1. The water saving aerator 100 shown in Embodiment 1 can save water and generate the bubble foam water.

As shown in FIG. 1, the water saving aerator 100 of the present invention includes the water saving disc 10, the diffuser object 20, the first cylinder 30, the second cylinder 40, the fastening object 50, the first gasket 60 and the second gasket 61.

In FIG. 1, all components such as the water saving disc 10, the diffuser object 20, the first cylinder 30, the second cylinder 40, the fastening object 50, the first gasket 60 and the second gasket 61 are shown in the cross-section view. However, the water tap 200 is shown by the front view, not by the cross-sectional view. The air cavity 70 and the water pass 71 and the ventilation pass 72 are formed as the space between the above-mentioned components.

Figure 2:
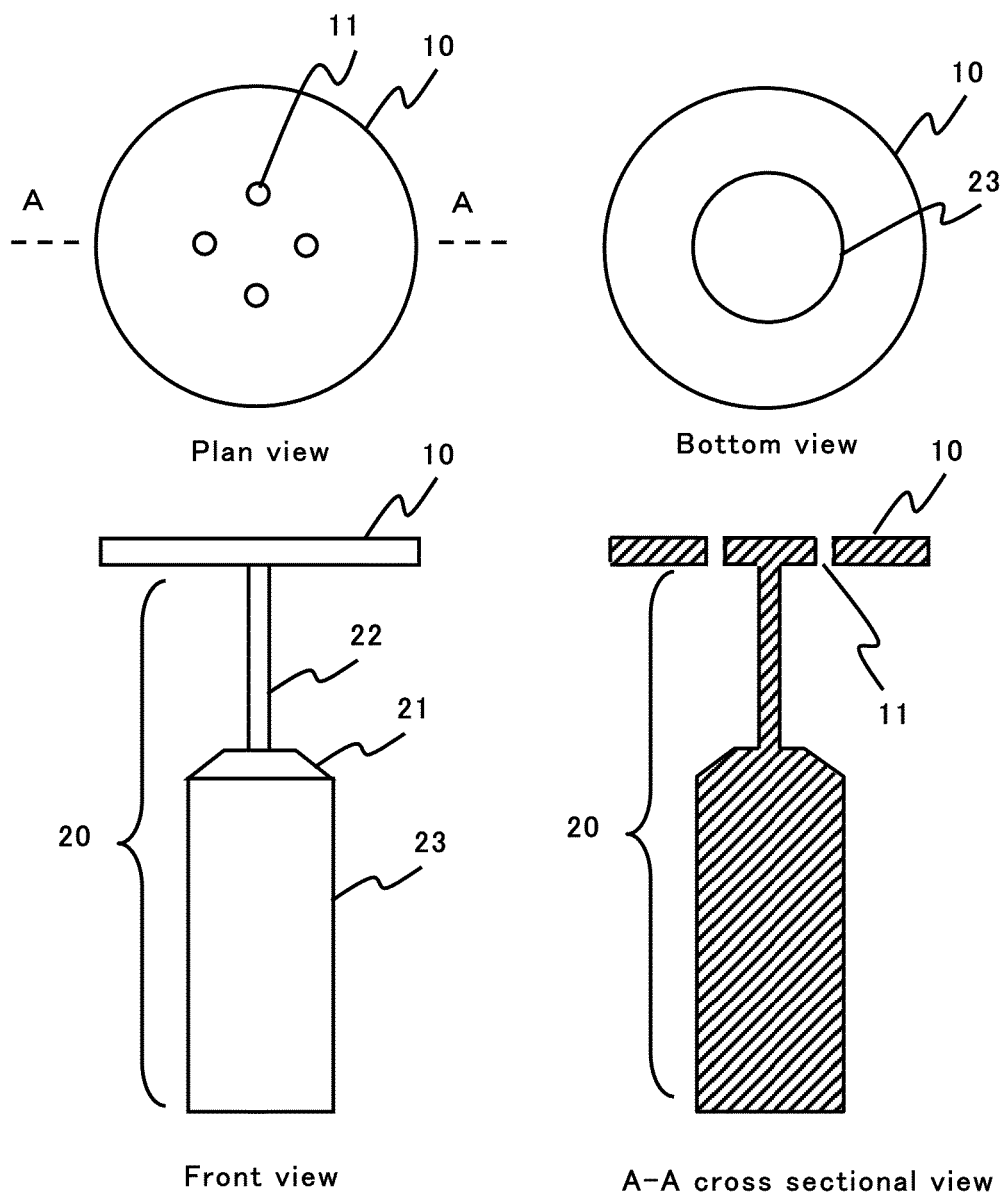
FIG. 2 is an exploded view showing the water saving disc 10 and the diffuser object 20 for ease of understanding.
Figure 3:
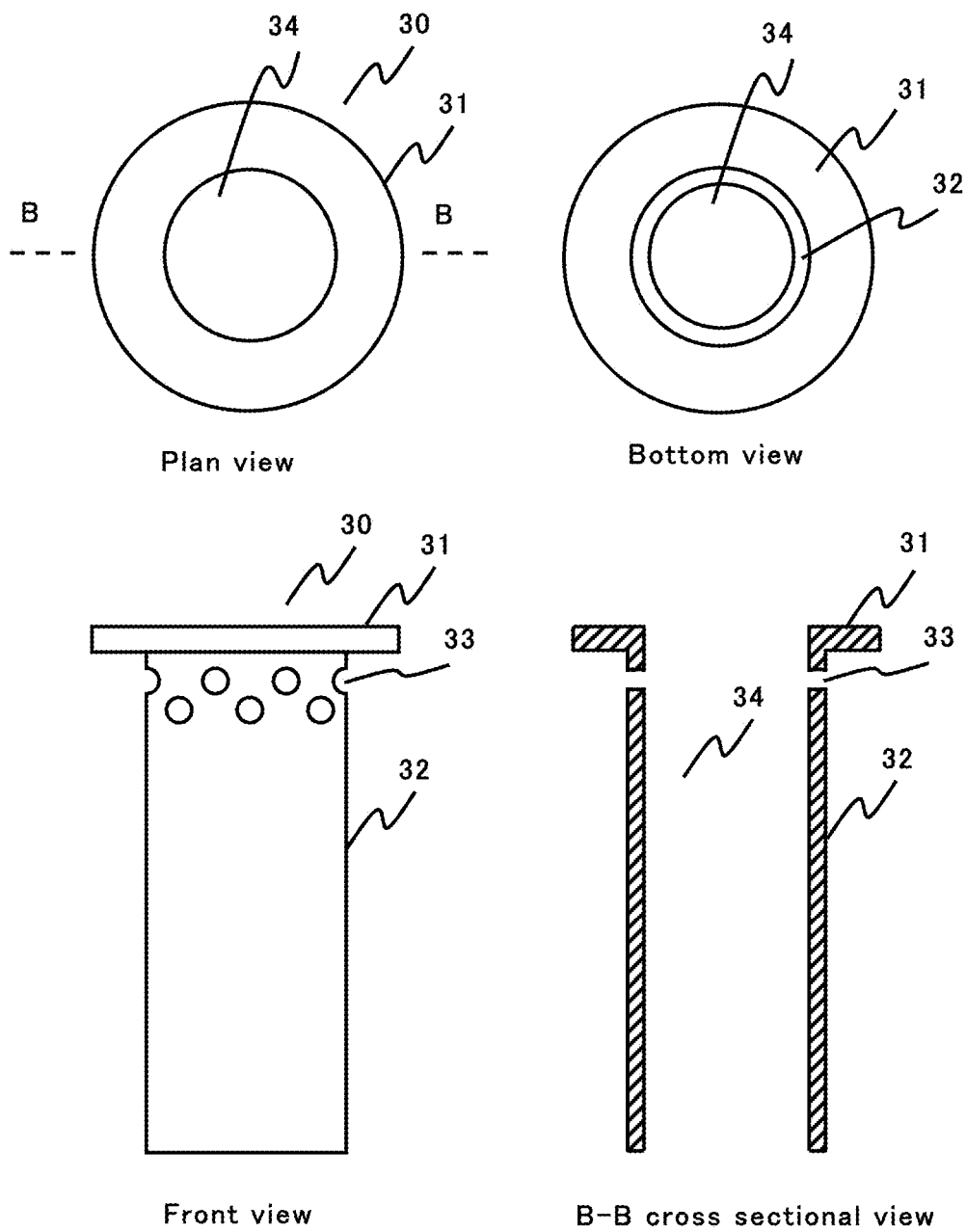
FIG. 3 is an exploded view showing the first cylinder 30 for ease of understanding.
Figure 4:
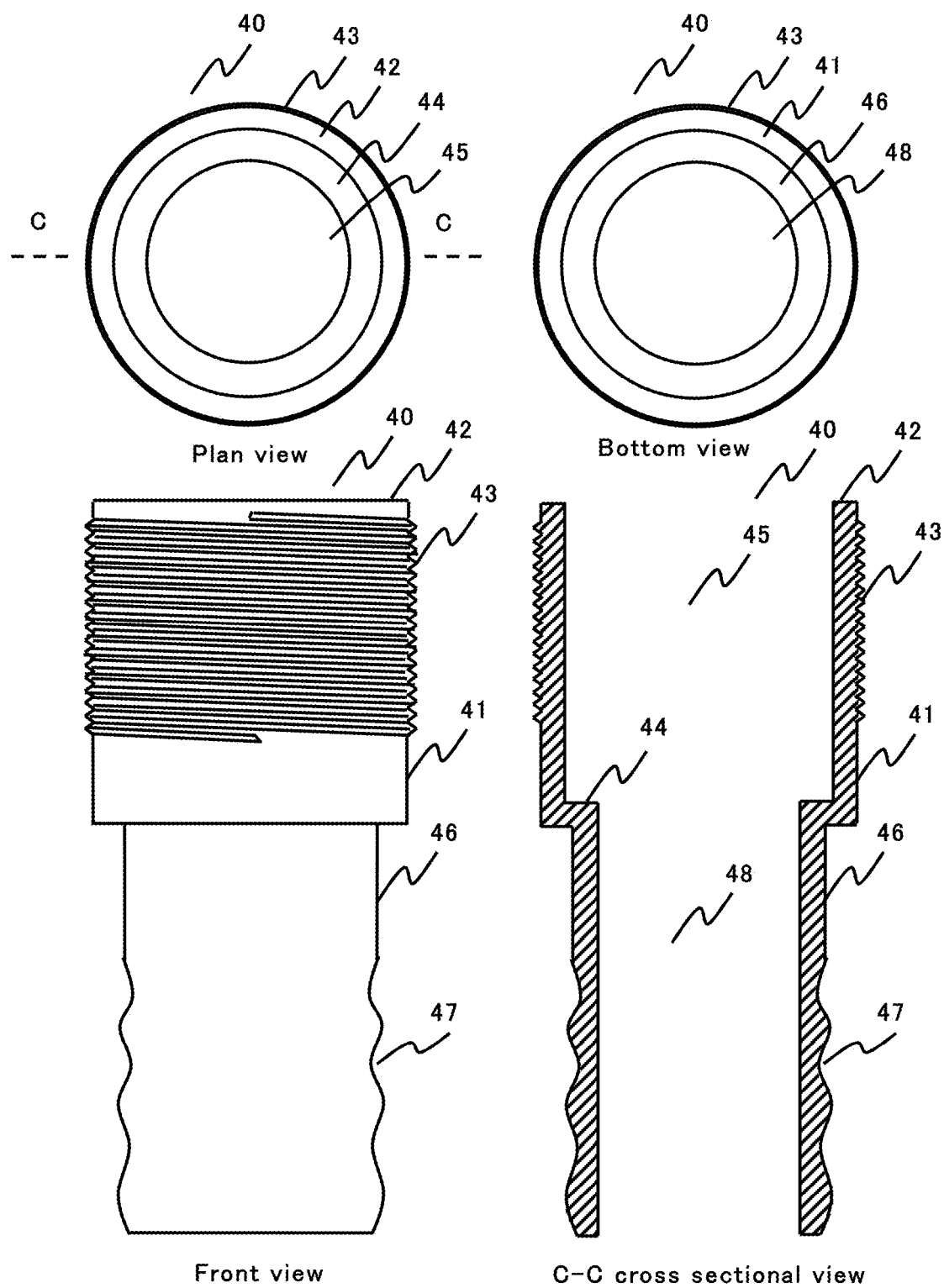
FIG. 4 is an exploded view showing the second cylinder 40 for ease of understanding.
Figure 5:
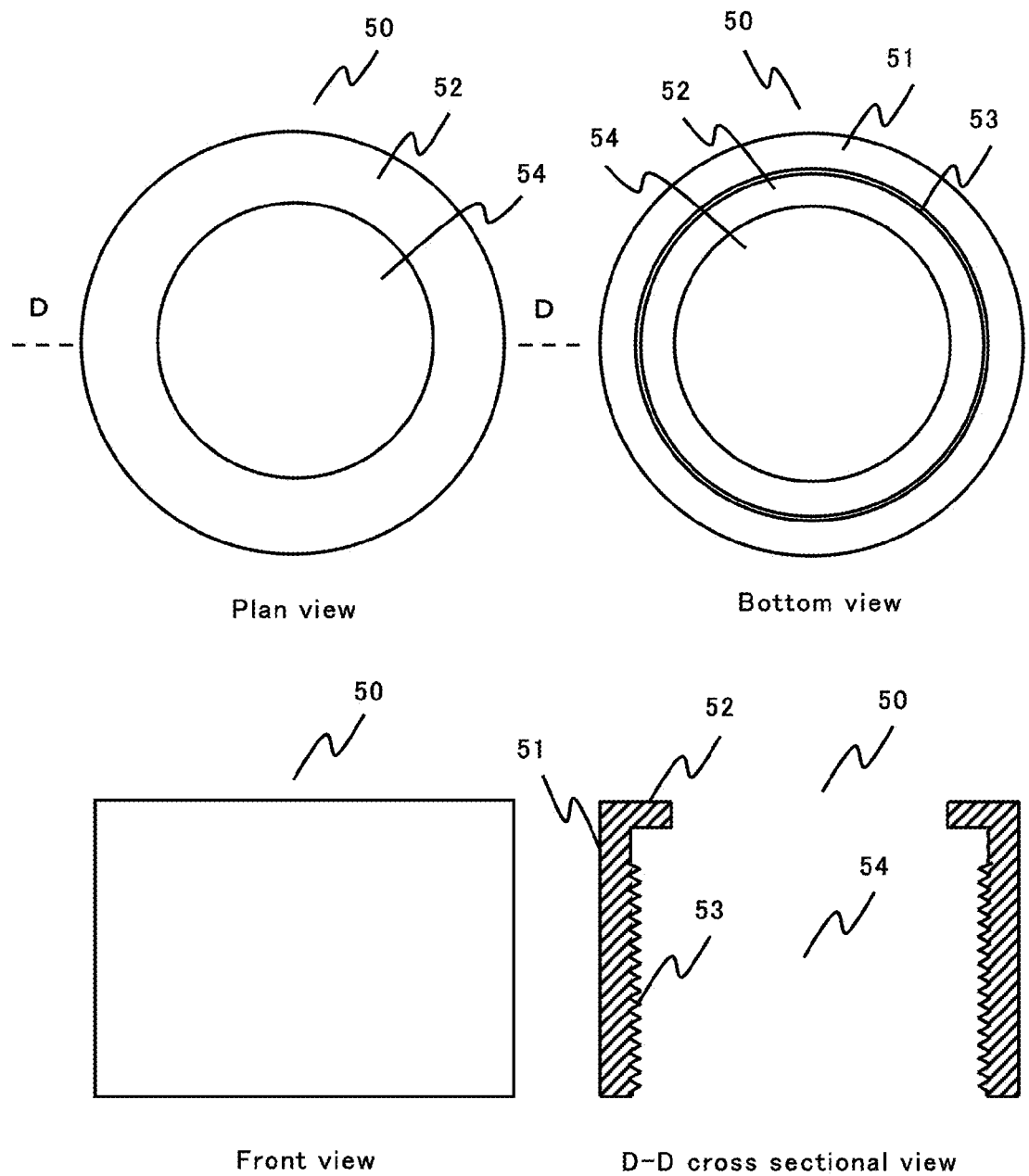
FIG. 5 is an exploded view showing the fastening-up object 50 for ease of understanding.

FIG. 2 is an exploded view showing the water saving disc 10 and the diffuser object 20, FIG. 3 is an exploded view showing the first cylinder 30, FIG. 4 is an exploded view showing the second cylinder 40, and FIG. 5 is an exploded view showing the fastening object 50.

Regarding the water saving disc 10 in this embodiment 1, the basic shape is a plan as disc shape, and the diameter of the water saving disc 10 is the same as that of the outer edge of the outflow opening 210 of the water tap 200. Therefore, the water saving disc 10 is selected corresponding to the shape and the size of the outflow opening of the water tap 200. However, most of the water taps are standardized according to use. For example, in most cases, the shape and the size of the water taps used in the same facility or used in the same school are unified.

As shown in FIG. 2, the water saving disc 10 comprises at least one through-hole 11 penetrating from upper surface to the bottom surface. In this configuration shown in FIG. 2., there are four through-holes 11. The diameter of these through-holes 11 is smaller than that of the water tap 200.

As shown in FIG. 2, the water saving disc 10 covers the outflow opening 210 of the water tap 200 by the upper surface and injects the water flow from the through-hole 11.

In this configuration, the through-hole 11 is a hole penetrating the pillar in the vertical direction, so the water flow goes straight in the vertical direction. However, as described below, the angle of the through-hole 11 is not limited to the vertical direction; a skewed angle can be possible as long as the water flow hits the diffuser plate 21 of the diffuser object 21.

If the diameters of the four through-hole 11 are the same and each cross-sectional area of the through-hole 11 is "b" and the cross-sectional area of the water tap 200 is "a", the total sum of the cross-sectional area of the outflow side is "4b", the water saving effect is achieved under the condition of "a">"4 b". In practice, the actual water saving effect depends on the speed of the water flow from the through-hole 11, so it isn't possible to calculate the water saving effect simply based on the cross-sectional area. However, it is possible to say that the water saving effect can be achieved under the condition of "a">"4b".

As shown above, the water saving effect can be achieved by narrowing the outflow cross-sectional area of the water flow to be smaller than the inflow cross-sectional area of the water flow by covering the opening 210 of the water tap 200 by the water saving disc 10.

In this configuration, the diffuser object 20 is a structure extended from the lower surface of the water saving disc 10 as shown in FIG. 2. The diffuser object 20 is hung from the lower surface of the water saving disc 10 and the diffuser object 20 is hit by the water flow from the through-hole 11. The diffuser object 20 comprises a diffuser plate 21 that diffuses the water flow in the peripheral direction, an extension object 22 extended from the lower surface of the water saving disc 10, a lower object 23 extended from the lower portion of the diffuser plate 21.

The diffuser plate 21 is a plate having certain skew for receiving the water flow coming from the through-hole 11 and diffusing the water flow in the peripheral direction. In this example, the diffuser plate 21 has about a 45 degree angle for receiving the water flow coming from the through-hole 11 and diffusing the water flow to the peripheral direction.

The extension object 22 is a bridge portion for connecting the lower surface of the water saving disc 10 and the diffuser plate 21. The shape of the extension object 22 is not limited to this example. In this configuration, the shape of the extension object 22 is a thin pillar-shape. However, the number of the extension object 22 is not limited to one. Two or more extension objects 22 can be used. In addition, the extension object 22 is not necessary as the independent module if the diffuser plate 21 is connected directly to the lower surface of the water saving disc 10.

The lower object 23 is the structure facing to the inner surface of the first cylinder 30 for forming the water pass 71 for the water flow running along the inner surface of the first cylinder 30. The water flow coming from the through-hole 11 of the water saving disc 10 is diffused by the diffuser object 20 in the peripheral direction and goes into the water pass 71 along the inner surface of the first cylinder 30. As shown in FIG. 1, the water pass 71 is formed between the lower object 23 and the inner surface of the first cylinder 30.

Next, the first cylinder 30 is a structure for covering the outer edge of the diffuser object 20. The first cylinder 30 receives the diffused water from the diffuser object 20 and leads the water down along the inner surface.

As shown in FIG. 3, the first cylinder 30 comprises a flange 31 at the upper edge, a cylinder object 32 extended from the flange 31, plurality of air intake holes 33 in the upper side wall of the cylinder object 32 and an inner space 34 in the cylinder object 32.

As shown in FIG. 1, the upper surface of the flange 31 is covered by the water saving disc 10, and the diffuser object 20 is present within the inner wall of the first cylinder 30. The space 34 between the lower surface of the water saving disc 10 and the upper surface of the diffuser plate 21 forms the air cavity 70. The gap between the inner wall of the cylinder 32 and the lower object 23 of the diffuser object 20 in the space 34 in the cylinder object 32 forms the water pass 71. As described later, the water flow coming from the water tap 200 via the through-hole 11 of the water saving disc 10 is diffused by the diffuser object 20 in the peripheral direction and goes into the water pass 71.

In this configuration, the first cylinder 30 achieves two functions. One is the function for providing the water pass for the water flow diffused by the diffuser object 20, the other is the function for generating the bubble foam water by cooperating with the second cylinder 40 as described later. The air intake hole 33 is located in the upper portion of the wall of the first cylinder 30 higher than the diffuser plate 21 of the diffuser object 20 when the diffuser object 20 is combined with the first cylinder 30.

Next, the second cylinder 40 covers the outer surface of the first cylinder 30 and forms the ventilation pass 72 between the inner surface of the second cylinder 40 and the outer surface of the first cylinder 30.

As shown in FIG. 4, the second cylinder 40 comprises a upper cylinder object 41, a upper edge 42 of the upper cylinder object 41, an external thread 43 formed on the outer surface of the upper cylinder object 41, a flange stopper 44 formed in the upper cylinder object 41, an inner space 45 of the upper cylinder object 41, a lower cylinder object 46, a corrugated outer surface 47 formed on the outer wall of the lower cylinder object 46 and an inner space 48 of the lower cylinder object 46.

As shown in FIG. 1, the second cylinder 40 supports the flange 31 with the flange stopper 44. As shown in FIG. 1, the second cylinder 40 covers the first cylinder 30, and the water saving disc 10 and the flange 31 of the first cylinder 30 are located in the space 45 in the upper cylinder object 41 of the second cylinder 40. The cylinder object 32 of the first cylinder 30 is located in the space 48 of the lower cylinder object 46 of the second cylinder 40. The ventilation pass 72 ventilating the outer air to the intake hole 33 is formed between the outer surface of the cylinder object 32 and the inner surface of the lower cylinder object 46 as described later.

This ventilation pass 72 runs through from the opening of the lower surface of the water saving aerator 100 via the gap between the outer surface of the first cylinder 30 and the inner surface of the second cylinder 40 to the air intake hole 33 around the upper portion of the first cylinder 30.

Hereinafter, the water flow and the air flow of the water saving aerator 100 are described step by step.

Figure 6:
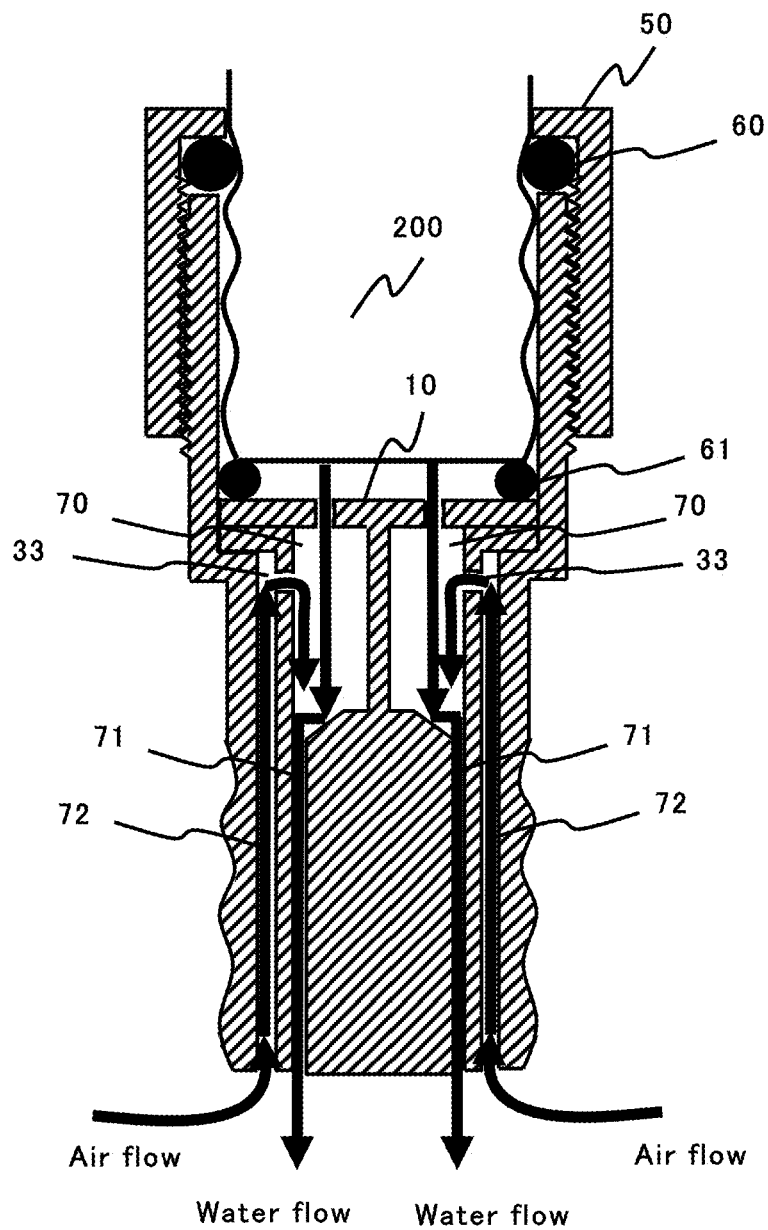
FIG. 6 is a schematic view showing the water flow and the air flow running in the water saving aerator 100.

FIG. 6 is a schematic view showing the water flow and the air flow running through the water saving aerator 100.

First, the narrowing water flow is injected from the opening 210 of the water tap 200 to the air cavity 70 via the through-hole 11 of the water saving disc 10. The water flow hits the diffuser plate 21 of the diffuser object 20, and the water flow is diffused by the diffuser plate 21.

The water flow diffused by the diffuser plate 21 of the diffuser object 20 in the peripheral direction goes into the water pass 71 formed between the inner surface of the first cylinder 30 and the lower object 23 of the diffuser object 20.

When the water flow goes into the water pass 71, the air pressure of the air cavity 70 in the first cylinder 30 is decreased by the water flow. The ventilation force at the air intake hole 33 around the upper portion of the first cylinder 30 is provided by the decrease of the inner air pressure of the air cavity 70. The air intake hole 33 is connected to the atmosphere via the ventilation pass 72, the outer air enters the air cavity 70 of the first cylinder 30 via the air intake hole 33.

As shown above, the water saving aerator 100 receives the water flow from the water tap 200, narrows down the water flow with the water saving disc 10, injects the water flow to the air in the air cavity 70, and diffuses the injected water flow in the peripheral direction with the diffuser object 20. In this manner, the water saving aerator 100 generates the high quality bubble foam water by mixing the air into the water flow running through the water pass 71.

In order to achieve the high efficiency of the saving effect and generate the high quality bubble foam water, the airtightness is required between each component. Especially, the fine airtightness is required at least at the following two portions.

One place where the fine airtightness is required is the space between the water saving disc 10 and the opening 210 of the water tap 200. The fine airtightness is required between these two components, because if there is not enough fine airtightness, the water flow leaks from not only the through-hole 11 of the water saving disc 10 but also the side gap on the upper surface of the water saving disc 10, and a water leaking problem can be caused by the water pressure of the water tap 200.

The fastening object 50 covers the outer surface of the second cylinder 40 and fastens the second cylinder 40, the first cylinder 30 and the water saving disc 10 as a whole by pressing them to each other in the vertical direction, and the upper surface of the water saving disc 10 is pressed to the opening 210 of the water tap 200.

As shown in FIG. 5, the fastening object 50 comprises a cylinder object 51, an inner flange 52 of the upper edge of the cylinder object 51, an internal thread 53 and an inner space 54 of the cylinder object 51.

In this configuration, the second gasket 61 is inserted between the upper surface of the water saving disc 10 and the outflow opening 210 of the water tap 200 when fastening them with the fastening object 50. The effect of the airtightness between the upper surface of the water saving disc 10 and the outflow opening 210 of the water tap 200 by the second gasket 61 is described below.

Figure 7:
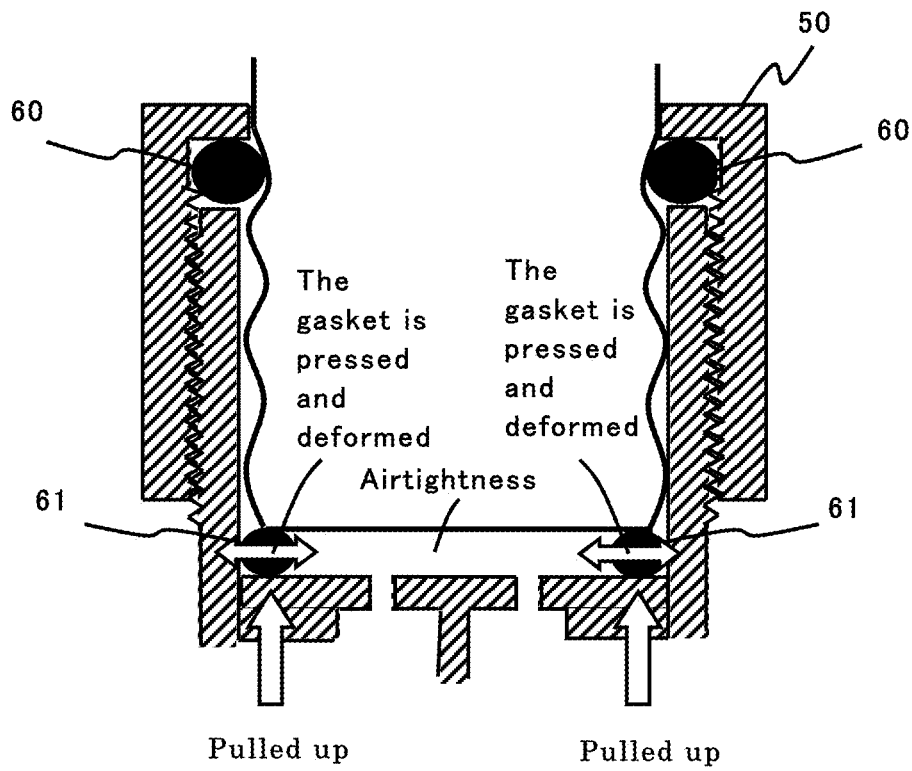
FIG. 7 is a schematic view showing the status for attaching upper surface of the water saving disc 10 to the water tap 210 of the water pipe 200 by the fastening-up object 50.

FIG. 7 is a schematic view showing the status for attaching the upper surface of the water saving disc 10 to the water tap 210 of the water pipe 200 with the fastening object 50.

The internal thread 53 in the inner surface of the fastening-up object 50 and the external thread 43 in the upper portion of the second cylinder 40 are screwed together. When the external thread 43 in the upper portion of the second cylinder 40 is screwed into the internal thread 53 of the fastening-up object 50, the second cylinder 40 is pulled up by this screwing. As shown in FIG. 1, the fastening-up object 50 is fixed to the target water tap by the first gasket 60 and becomes a stable base. In this configuration, there is a corrugated outer surface 47 on the outer surface of the water tap 200, and the first gasket 60 fits this corrugated outer surface 47 so the fastening object 50 is fixed.

There is the flange stopper 44 on the inner surface of the second cylinder 40 to support the lower surface of the flange 31 of the first cylinder 30. When the second cylinder 40 is pulled up by screwing into the fastening object 50, the flange stopper 44 of the second cylinder 40 are pulled up together and the flange 31 of the first cylinder 30 is pulled up by the flange stopper 44 in turn. When the flange 31 of the first cylinder 30 is pulled up, the water saving disc 10 is pulled up by the flange 31 in turn.

By screwing the second cylinder 40 into the fastening object 50, the flange stopper 44 of the second cylinder 40, the flange 31 of the first cylinder 30 and the water saving disc 10 are pulled up as a whole.

In this configuration, as shown in FIG. 7, the second gasket 61 is inserted between the upper surface of the water saving disc 10 and the outflow opening 210 of the water tap 200, so the second gasket 61 deforms and expands in the peripheral direction by being pressed by the upper surface of the water saving disc 10 and the outflow opening 210 of the water tap 200. In this configuration, the space around the water saving disc 10 is surrounded by the inner wall of the second cylinder 40, so the outer edge of the second gasket 61 faces the inner wall of the second cylinder 40. Therefore, the outer edge of the second gasket 61 is pressed strongly against the inner wall of the second cylinder 40 when the second gasket 61 expands in the peripheral direction. The inner surface of the ring-shaped second gasket 61 becomes a high quality airtight space because it is surrounded tightly by the outflow opening 210 of the water tap 200, the second gasket 61, and upper surface of the water saving disc 10. With the above-mentioned configuration, the water inflow of this space is the opening 210 of the water tap 200, the water outflow of this space is the through-hole 11 of the water saving disc 10, so this space between opening 210 of the water tap 200 and the water saving disc 10 can have good airtightness.

Next, the other portion where the fine airtightness is required is the space between the fastening object 50 and the opening 210 of the water tap 200. These two components should be combined precisely and tightly.

If the fastening object 50 and the water tap 200 are not combined precisely and tightly, the fastening object 50 is pressed down by the water pressure from the water tap 200, and the water saving aerator 100 will drop from the water tap 200 in worst case.

In this configuration in embodiment 1, the fastening object 50 comprises an inner flange 52 facing to the upper edge of the second cylinder 40. In other words, the inner flange 52 bent inside on the upper edge of the fastening object 50 faces the upper edge 42 of the second cylinder 40 when the second cylinder 40 comes up by screwing into the internal thread 53 of the inner wall of the fastening object 50.

Figure 8:
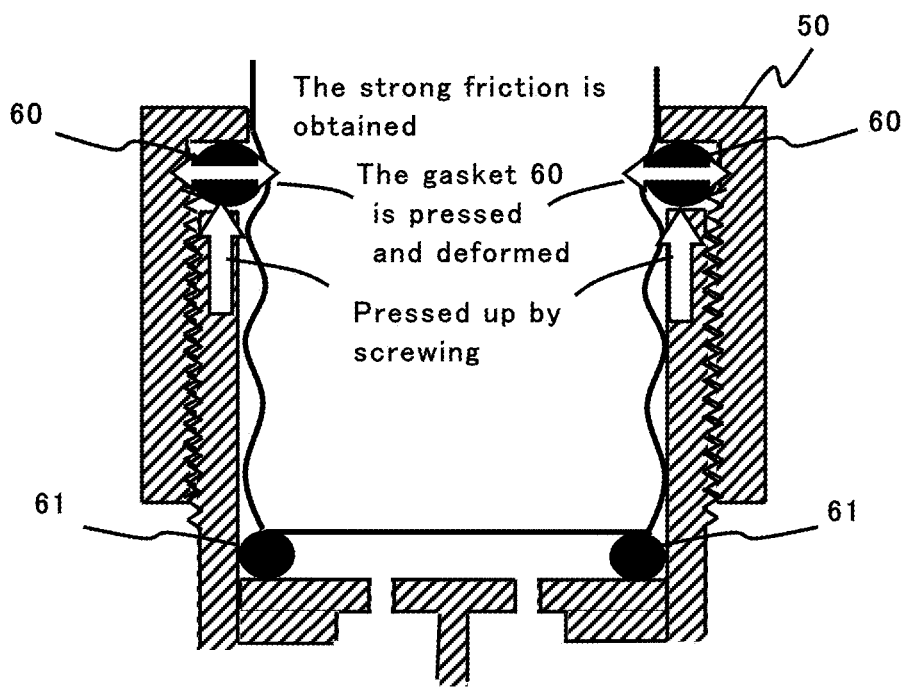
FIG. 8 is a schematic view showing the status of the second gasket 61 for filling up the gap, deformed by being pressed between the upper edge of the second cylinder 40 and the upper inner flange 52 of the fastening-up object 50.

In this configuration, the first gasket 60 is inserted between the inner flange 52 of the fastening object 50 and the upper edge 42 of the second cylinder 40. As shown in FIG. 8, the first gasket 60 will deform and expand by being pressed by the upper edge 42 of the second cylinder 40 and the inner flange 52 of the fastening object 50 coming up by screwing. In this configuration, the space around the upper surface of the upper edge 42 of the second cylinder 40 is surrounded by the inner wall of the fastening-up object 50, in other words, the outer edge of the first gasket 60 faces the inner wall of the fastening object 50. Therefore, if the first gasket expands by being pressed, the outer edge of the first gasket 60 is limited by the inner wall of the fastening-up object 50, so the first gasket 60 expands in the inner direction.

However, the inner edge of the first gasket 60 faces the outer wall of the water tap 200, so the first gasket 60 is pressed strongly to the outer wall of the water tap 200 when expanding in the inner direction. Therefore, the strong friction force is generated between the outer edge of the first gasket 60 and the inner wall of the fastening object 50, in addition, the strong friction force is generated between the inner edge of the first gasket 60 and the outer wall of the water tap 200. The water saving aerator 100 is installed and fixed firmly to the water tap 200.

It is preferable that the outer surface of the water tap 200 is the corrugated outer surface which can fit the outer edge of the first gasket 60 in order to fix the water saving aerator 100 to the water tap 200 firmly. These trenches can fit the outer edge of the first gasket 60, the first gasket 60 is fixed to the water tap 200, unable to move down, and the inner flange 52 of the fastening object 50 cannot move down.

In general, the corrugated outer surface 47 of the outer surface of the water tap 200 is used for enhancing the friction when attaching the hose to the water tap 200, in this configuration, the corrugated outer surface 47 is made on the outer surface of the lower cylinder object 46 of the second cylinder 40 instead.

As shown above, the high quality fine airtightness can be obtained between the fastening object 50 and the water tap 200 by inserting the first gasket 60 between the inner flange 52 of the fastening-up object 50 and the upper edge 42 of the second cylinder 40.

According to the water saving aerator 100 of the embodiment 1 of the present invention, high efficiency water saving effect can be obtained and the production of high quality fine bubble foam water can be obtained.

The inventor has made the water saving aerator 100 actually and confirmed the high efficiency water saving effect and the production of high quality fine bubble foam water by the water saving aerator 100 shown in this embodiment 1.

(Embodiment 2)

A schematic view of the water saving aerator 100*a* is shown as an example of this embodiment 2. The water saving aerator 100*a* shown in this embodiment 2 can achieve the high quality water saving effect the same as those shown in embodiment 1, in addition, the water saving aerator 100a can produce more fine bubble foam water by cutting and scattering.

The water saving aerator 100a of embodiment 2 includes the water saving disc 10, the diffuser object 20a, the first cylinder 30, the second cylinder 40, the fastening object 50, the first gasket 60 and the second gasket 61. The configuration of the water saving aerator 100a of this embodiment 2 is the same as that of the water saving aerator 100 of embodiment 1 except for the diffuser object 20a. The diffuser object 20a is different from the diffuser object 20 shown in embodiment 1.

Figure 9:
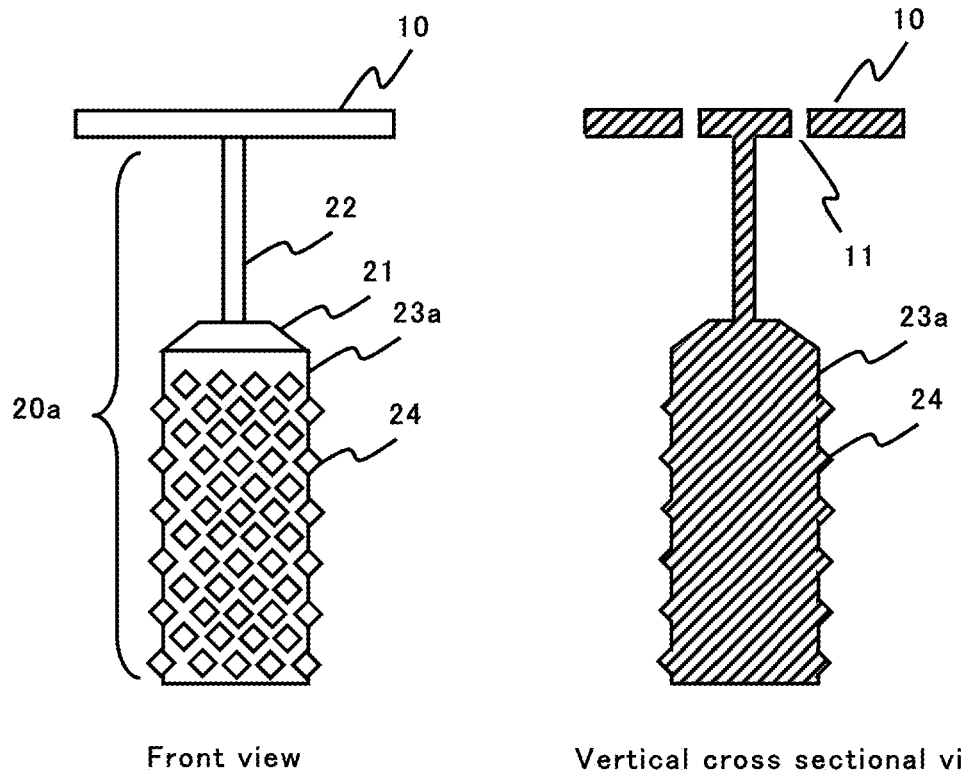

FIG. 9 is an exploded view showing the structure of the diffuser object 20a.

The diffuser object 20a is installed in the position where the water flow coming from the through-hole 11 of the water saving disc 10 hits, and the diffuser object 20a diffuses the water flow in the peripheral direction. These features are the same those of the diffuser object 20 shown in embodiment 1. However, the components such as a number of trenches and serrations on the surface of the lower object 23a shown in embodiment 2 are the different from the lower object 23 shown in embodiment 1.

The water pass is formed between the lower object 23a of the diffuser object 20a and the inner wall of the first cylinder 30, the same as embodiment 1. However, as shown in FIG. 10, there are many serrations 24 on the surface of the lower object 23a of this embodiment 2, and when the water flow runs through this water pass, the water flow is cut and scattered by the serration 24 into small cluster and becomes more fine bubble foam water by mixing with air. The serrations 24 can be formed by making a lot of trenches on the surface of the lower object 23a instead of making a lot of projections on the lower object 23a. In this case, the portion where the trench is not formed can be regarded as the projection, so the serration 24 can be formed in result.

As shown above, when the water flow runs through the water pass 71, the water flow is cut and scattered by the serrations 24 formed on the lower object 23a. The bubble foam water is generated by the air intake as shown in embodiment 1, in addition, the water flow is cut and scattered into small clusters, and as a result, more fine bubble foam water can be obtained.

The water saving aerator 100a of embodiment 2 can achieve the high efficient water saving effect and produce the high quality fine bubble foam water.

(Embodiment 3)

A schematic view of the water saving aerator 100b is shown as an example of this embodiment 3. The water saving aerator 100b shown in this embodiment 3 can achieve the same high quality water saving effect as that shown in embodiment 1, in addition, the water saving aerator 100b can produce more fine bubble foam water by cutting and scattering.

The water saving aerator 100b of embodiment 3 includes the water saving disc 10, the diffuser object 20, the first cylinder 30b, the second cylinder 40, the fastening-up object 50, the first gasket 60 and the second gasket 61. The configuration of the water saving aerator 100b of this embodiment 3 is the same as that of the water saving aerator 100 of embodiment 1 except for the first cylinder 30b. The first object 30b includes a lot of serrations 35 on the inner wall of the cylinder object 32.

Figure 11:
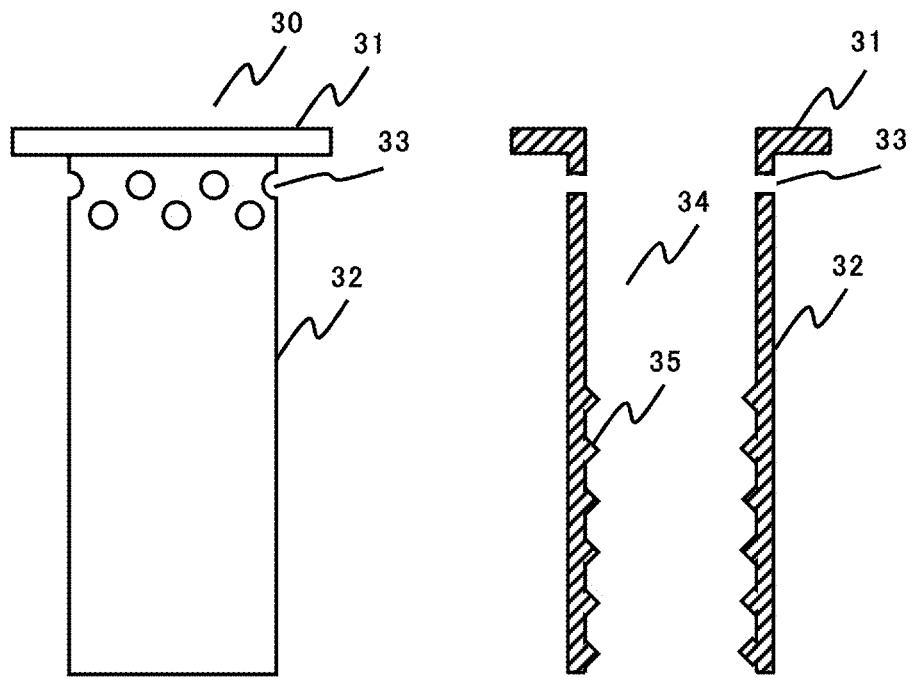
FIG. 11 is an exploded view showing the structure of the first cylinder 30b.

FIG. 11 is an exploded view showing the structure of the first cylinder 30b. The diffuser 20 is formed where the water flow coming from the through-hole 11 of the water saving disc 10 hits, and the water flow is diffused in the peripheral direction and runs through the water pass 71 between the lower object 23 of the diffuser object 20 and the inner wall of the first cylinder 30b. These features of the water saving aerator 100b of this embodiment 3 are the same as those of the water saving aerator 100 shown in embodiment 1. However, the components such as a number of trenches and serrations on the surface of the first cylinder 30b shown in embodiment 3 are different from the first cylinder 30 shown in embodiment 1.

If there are serrations 35 on the surface of the first cylinder 30b as shown in this embodiment 3, the water flow is cut and scattered by the serration 35 formed on the surface of the first cylinder 30b into small clusters and becomes more fine bubble foam water by mixing with air.

The serrations 35 can be formed by making a lot of trenches on the surface of the first cylinder 30b instead of making a lot of projections on the first cylinder 30b. In this case, the portion where the trench is not formed can be regarded as the projection, so the serrations 35 can be formed as a result.

Figure 12:
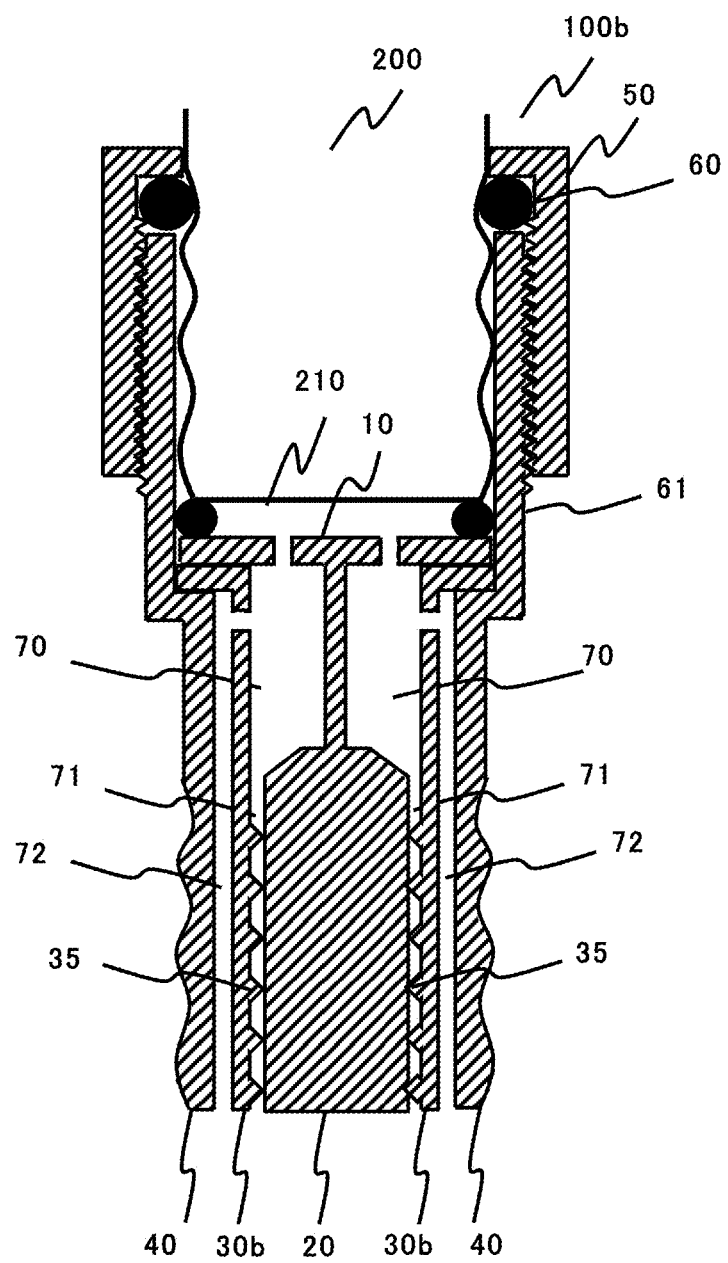
FIG. 12 is a schematic view of the serration 35 protruded on the first cylinder 30b in the water flow 71 for cutting and scattering the water flow into small cluster.

As shown above, when the water flow runs through the water pass, the water flow is cut and scattered by the serrations 35 formed on the first cylinder 30b. In FIG. 12, the serrations 35 formed on the first cylinder 30b are drawn simply. The bubble foam water is generated by the air intake as shown in embodiment 1, in addition, the water flow is cut and scattered into small clusters because there is the serration 35 in the water pass, and as a result, more fine bubble foam water can be obtained.

The water saving aerator 100b of embodiment 3 can achieve the high efficient water saving effect and produce the high quality fine bubble foam water.

(Embodiment 4)

A schematic view of the water saving aerator 100c is shown as an example of this embodiment 4. The water saving aerator 100c shown in this embodiment 4 includes plural combined sets of the components of the water saving disc 10 and the diffuser object 20 and the first cylinder 30. In this configuration, the second cylinder 40 covers the plural combined sets of the components of the water saving disc 10 and the diffuser object 20 and the first cylinder 30. The fastening object 50 fastens the second cylinder 40. In this configuration, the water saving aerator 100c can disperse and output many water jets compared with the water saving aerator 100 that can output fewer water jets.

Figure 13:
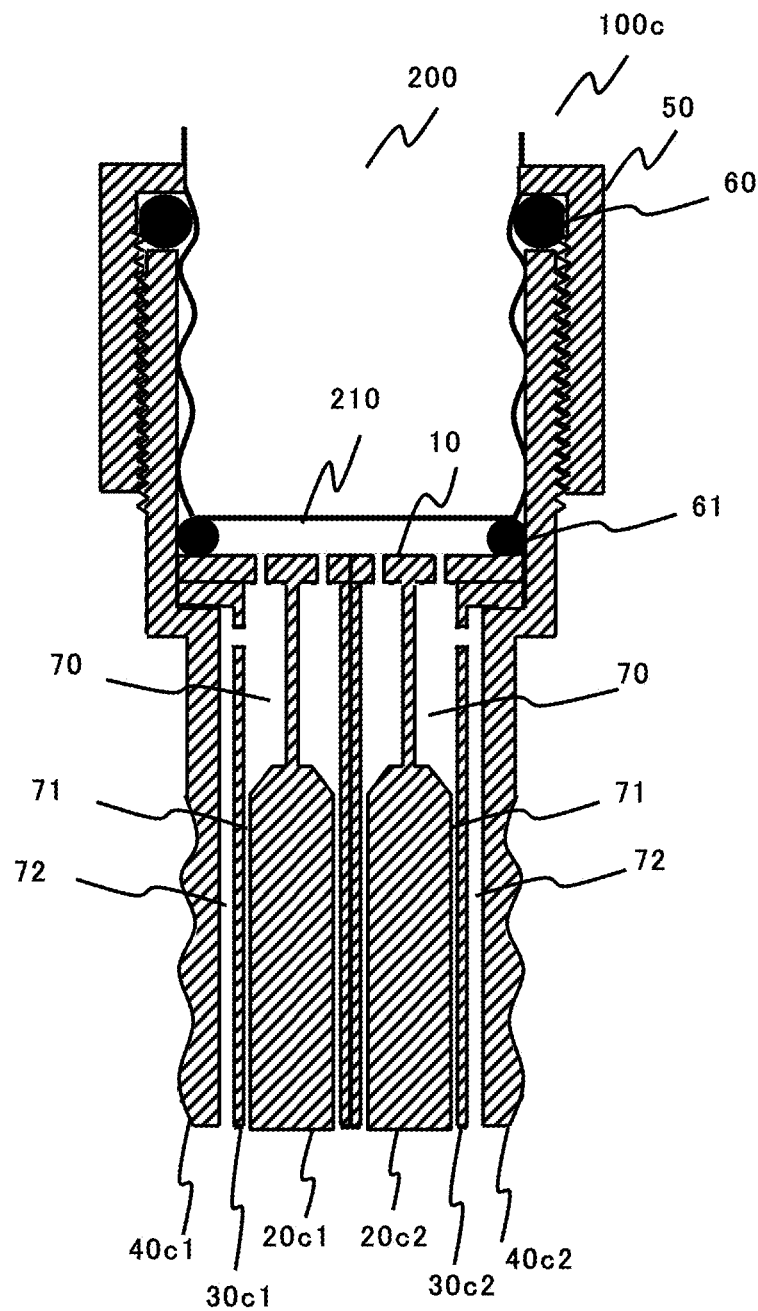
FIG. 13 is a schematic view of showing the structure of the water saving aerator 100c including plural sets of the water saving disc 10 and the diffuser object 20 and the first cylinder 30.

FIG. 13 is a schematic view of showing the structure of the water saving aerator 100c. In this configuration, the water saving aerator 100c includes 2 combined sets of the components of the water saving disc 10 and the diffuser object 20 and the first cylinder 30. As shown in FIG. 13, the second cylinder 40 includes 2 sets of the components. One is the first set of the combined components of the water saving disc 10c1 and the diffuser object 20c1 and the first cylinder 30c1, and the other is the second set of the combined components of the water saving disc 10c2 and the diffuser object 20c2 and the first cylinder 30c2.

For example, in the first set of the components, the diffuser object 20c1 is formed at the position where the water flow coming from the through-hole 11 of the water saving disc 10c1 hits, and the diffused water in the peripheral direction runs into the water pass 71 formed between the lower object 23c1 and the inner wall of the first cylinder 30c1. These features are the same as those of embodiment 1. However, in this configuration, the ventilation pass 72 between the outer wall of the first cylinder 30c1 and the inner wall of the second cylinder 40c1 is formed on the periphery side of the first set. The same as the first set of the components, the diffuser object 20c2 is formed at the position where the water flow coming from the through-hole 11 of the water saving disc 10c2 hits, the diffused water in the peripheral direction runs into the water pass 71 formed between the lower object 23c2 and the inner wall of the first cylinder 30c2, the ventilation pass 72 between the outer wall of the first cylinder 30c2 and the inner wall of the second cylinder 40c2 is formed on the periphery side of the second set.

There are plural sets of the combined components of the water saving disc 10, the diffuser object 20 and the first cylinder 30, and the functions of these components are the same as those shown in embodiment 1, embodiment 2 and embodiment 3, so the explanations for these are omitted here.

As shown above, the water saving aerator 100c can disperse and output many water jets compared with the water saving aerator 100 that can output fewer water jets by utilizing the plural sets of the components combined of the water saving disc 10, the diffuser object 20 and the first cylinder 30.

Industrial Applicability

The water saving aerator according to the present invention can be used as the water saving apparatus and the bubble foam water generator. The water saving aerator can be applied to various apparatus. For example, it can be applied to the water tap (water tap not only for commercial use but also for special use such as laboratory use), the shower head (shower head not only for special use such as bathroom use but also for gardening use), and the special water delivery pipe (for example, the water delivery pipe for eye-washing water tap in a pool facility).

While some preferable embodiments of the water saving aerator according to the present invention are described above, it should be understood that various changes are possible, without deviating from the technical scope according to the present invention. Therefore, the technical scope according to the present invention is limited only by the claims attached.

The invention claimed is:

1. A water saving aerator adapted to be attached to a water tap, comprising;
    a water saving disc covering an outflow opening of the water tap and having a through-hole whose total water outflow cross-sectional area is less than a cross-sectional area of the water tap;
    a first cylinder comprising a wall with inner and outer surfaces and an air cavity inside, the air cavity containing air while water is flowing therethrough; and
    a diffuser object disposed in the first cylinder for diffusing a water flow coming from the water saving disc in a peripheral direction, the diffuser object comprising a diffuser surface having an inclined smooth surface with reduced height in the peripheral direction and a pillar shaped lower object that extends from a lower portion of the diffuser surface to substantially the same height as a lower end of the wall of the first cylinder, the lower object having a cylindrical surface that extends to a bottom of the aerator along the inner surface of the first cylinder so as to form a thin tubular shaped water passage; wherein
    the water passage transforms the water flow into a thin tubular shaped water flow while being filled with the water flow so as to block air backflow through the water passage to reach the air cavity, and
    the water passage is configured sufficiently thin and long so that air tightness is maintained between the water passage and the air cavity when water is flowing.

2. The water saving aerator according to claim 1, in which the diffuser object is extended from and hung from a lower surface of the water saving disc, the diffuser surface being located in a place facing the through-hole of the water saving disc, and diffusing the water flow coming from the through-hole in the peripheral direction.

3. The water saving aerator according to claim 1, in which the water flow is injected to the air cavity from the through-hole of the water saving disc and led to the water passage through air in the air cavity,
    bubble foam water is generated by mixing of the air of the air cavity into the water flow injected from the water saving disc, diffusing in the peripheral direction with the diffuser object, and leading the water flow to the water passage with the first cylinder.

4. The water saving aerator according to claim 3, further comprising;
    a second cylinder having an inner surface and covering the first cylinder, a gap being provided between the inner surface of the second cylinder and the outer surface of the first cylinder, and
    an air intake hole formed on an upper portion of the wall of the first cylinder higher than the diffuser object,
    wherein a ventilation passage is formed by the gap and the air intake hole, and
    air flow entering into the air cavity through the ventilation passage via the air intake hole is generated by utilizing a decrease of air pressure by the water flow and the air flow from the air cavity to the water passage.

5. The water saving aerator according to claim 3, further comprising;
    an air intake hole formed on an upper portion of the wall of the first cylinder higher than the diffuser object,
    in which a lower surface of the water saving disc and an upper surface of the first cylinder tightly contact each other so that the water flow is permitted only within the first cylinder and the air flow is permitted only from the air intake hole.

6. The water saving aerator according to claim 4, further comprising;
    a fastening object for pulling up the second cylinder and fixing the second cylinder to the water tap,
    a flange formed on an upper surface of the first cylinder for contacting a lower surface of the water saving disc, and
    a flange stopper formed on the inner surface of the second cylinder facing to the flange of the first cylinder,
    wherein the flange of the first cylinder, the flange stopper of the second cylinder and the lower surface of the water saving disc are fastened and pulled up by the fastening object, and an upper surface of the water saving disc is pressed to the water tap.

7. The water saving aerator according to claim 4, further comprising a gasket inserted between an upper surface of the water saving disc and the water tap, wherein when the water saving disc is pulled up, the gasket is deformed between the upper surface of the water saving disc and the water tap, whereby airtightness between the upper surface and the water tap can be enhanced by pressing an outer edge of the gasket to the inner surface of the second cylinder.

8. The water saving aerator according to claim 6, further comprising a gasket, in which the fastening object comprises an inner flange facing to an upper surface of the second cylinder, and the gasket is inserted between the inner flange of the fastening object and the upper surface of the second cylinder;
    the gasket is deformed by being pressed by an upper edge of the second cylinder, a strong friction force is generated between an outer edge of the gasket and an inner wall of the fastening object, and a strong friction force is generated between an inner edge of the gasket and an outer wall of the water tap.

9. The water saving aerator according to claim 1, wherein a diameter of the inner surface of the first cylinder is smaller than a diameter of the outflow opening of the water tap.

* * * * *